G. H. WION AND A. E. HUDD.

ELECTRICAL POINT DETECTOR FOR RAILWAYS.

APPLICATION FILED DEC. 24, 1921.

Reissued Sept. 12, 1922. 15,456.

3 SHEETS—SHEET 1.

Alfred E. Hudd and
George H. Wion,
INVENTORS
BY Neil H. Preston,
their ATTORNEY.

G. H. WION AND A. E. HUDD.

ELECTRICAL POINT DETECTOR FOR RAILWAYS.

APPLICATION FILED DEC. 24, 1921.

Reissued Sept. 12, 1922. 15,456.

3 SHEETS—SHEET 2.

Alfred E. Hudd, and
George H. Wion,
INVENTORS,
BY Neil W. Preston,
their ATTORNEY.

G. H. WION AND A. E. HUDD.

ELECTRICAL POINT DETECTOR FOR RAILWAYS.

APPLICATION FILED DEC. 24, 1921.

Reissued Sept. 12, 1922.

15,456.

3 SHEETS—SHEET 3.

Alfred E. Hudd, and
George H. Wion,
INVENTORS,
BY Neil H. Preston,
their ATTORNEY.

Reissued Sept. 12, 1922. Re. 15,456

UNITED STATES PATENT OFFICE.

GEORGE H. WION, OF MELBOURNE, VICTORIA, AUSTRALIA, AND ALFRED E. HUDD, OF LIVERPOOL, ENGLAND.

ELECTRICAL POINT DETECTOR FOR RAILWAYS.

Original No. 1,343,133, dated June 8, 1920, Serial No. 173,659, filed June 8, 1917. Application for reissue filed December 24, 1921. Serial No. 524,773.

*To all whom it may concern:*

Be it known that we, GEORGE HARRY WION, a citizen of the United States of America, residing at Melbourne, in the State of Victoria, Commonwealth of Australia (whose postoffice address is % Victorian Railways, Spencer St., Melbourne, Victoria, Australia), and ALFRED ERNEST HUDD, a subject of the King of Great Britain and Ireland, etc., residing at Liverpool, England (whose post-office address is Stoneleigh, Orient Drive, Gateacre, Liverpool, England), have invented certain new and useful Improveprovements in and Relating to Electrical Point Detectors for Railways; and we do hereby declare the following to be a full, clear, and exact description of the invention, such as will enable others skilled in the art to which it pertains to make and use the same.

This invention relates to improvements in the electrical detection of the position of switch points and their locking devices with which facing or trailing points of railways, tramways, and the like are usually provided.

In connection with an interlocking system in which the movable switch points are operated, either by hand or by power, it is important that the signals or other devices controlling train movements should not be operated in such a manner as to permit a train to pass over a switch unless the points thereof are in a safe condition, that is, unless the pair of switch points are both in the proper position and the locking device is also in the proper condition.

By this invention the predetermined position or positions of a pair, or a plurality of pairs, of switch points, and likewise the position or positions of the locking devices therefor, are automatically detected. This detection is effected by altering the electric contacts so that different circuit connections are set up for the different positions of the switch points. For example, if the switch points are in the normal position, the electrical contacts may be set up so that the direction of flow of current will be either positive or negative, with the switch points in a reversed position, the direction of flow of current will be reversed, and with the switch points in any intermediate position, the circuit is broken and the control wires are short-circuited. Other individual circuits may also be opened or closed as desired.

More specifically, the invention contemplates a common circuit controller operable by any one or all of a number of bars, separately connected to the switch points, and also by the locking plunger or other locking mechanism for the switch. The common circut controller or contact carrier is pivotally mounted upon a shaft or equivalent and arranged to be oscillated; and means are provided whereby a spring or springs may be put into compression by one or more of the bars connected to the switch points for the purpose of impelling the circuit controller to assume either of two extreme positions, and whereby any predetermined movement of any one or all of said bars will postively force the circuit controller away from either of its extreme positions and into its intermediate or neutral position.

Various detail characteristic features and advantages of the point detector embodying this invention will be pointed out hereinafter.

In the accompanying drawings Figure 1 is a plan of our detector box with its cover removed.

Figure 10:
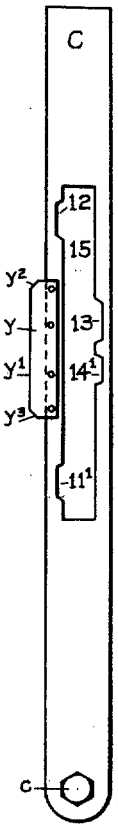
Figure 11:
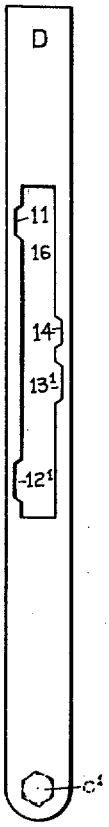
Figure 8:
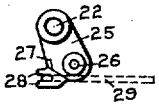
Figure 9:
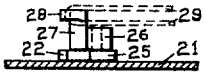
Figure 12:
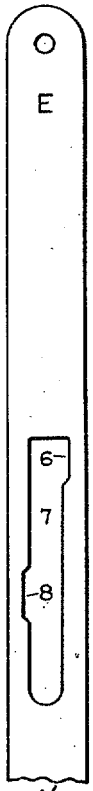
Figure 13:
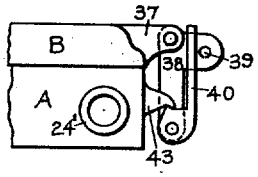
Figure 14:
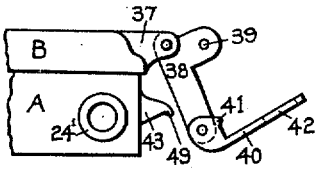

Figure 8 is a plan, and Figure 9 an elevation, showing crank details. Figure 10 is a plan of a sliding bar and Figure 11 a plan of a second sliding bar. Figure 12 is a plan of a plunger bar but omitting a lever. Figure 13 is an elevation of part of the detector case with its latch closed, and Figure 14 another elevation thereof with the latch open.

Figure 15:
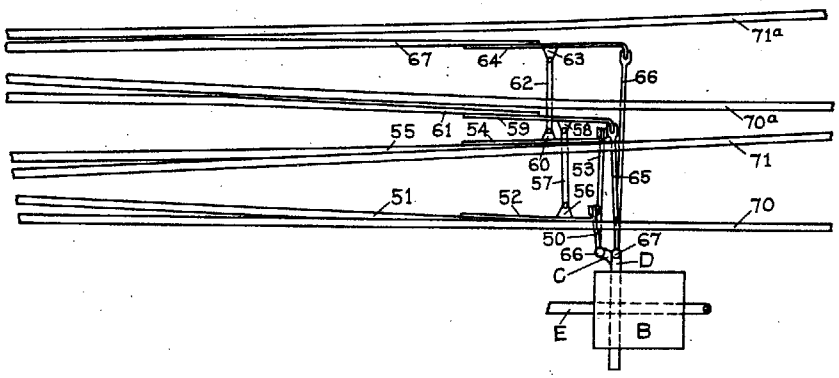

Figure 15 is a diagram showng permanent way compound points or slips fitted with our inventon.

Figure 16:
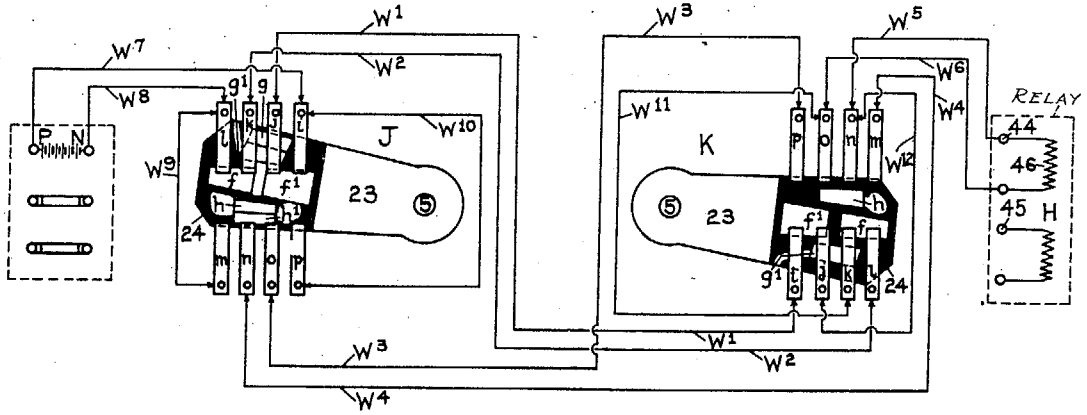

Figure 16 is a diagram showing electrical connections.

In varous figures some of the parts have been omtted or broken out for clearness of illustration or to save space. Our detector box or casing (see Figures 1, 2, 13, and 14) has a lid B having a water proofing gasket 36, and has latch lugs 43 and holding down bolt lugs 38*. Box A has guides 2, 3, having bases $2^1$, $3^1$, with upstanding sides 2* 3* adapted to receive slotted sliding bars C, D, 2, 3 are bolted cover plates.

The base 21 (Figure 2) of the detector box is provided with a guide 4 having depending sides $4^1$, adapted to receive a slotted sliding plunger bar E (Figures 1, 2, 3, and 12) and provided with a cover plate 4* secured with bolts.

Base 21 having bearing plates $7^1$, carries a shaft 5 axially arranged at the cross intersection of the longitudinal axes of the slotted sliding bars and the slotted plunger bar, shaft 5 being adapted to carry two levers F and G and base plate 23 with its contacts as described. Levers G is shown as mounted to lie within slot 7 in the plunger bar E and is formed with a head *d* so designed that at one predetermined position of bar E it may occupy recess 6 formed in one side of the long slot 7, and at another predetermined position of bar E recess 8 in the opposite side of slot 7. Alternatively lever G may be arranged to lie outside the plunger bar E, or clear of slot 7 and the head *d* (or heads as hereinafter set out) may depend from lever G and occupy a recess or recesses or projection or projections as hereinafter set out. Obviously lever G could be constructed with a head (as *d*) at each end and recesses in slot 7 to co-act therewith.

The lever F is located within slots 15 and 16 formed in one, two, or more sliding bars C, D, said bars moving in a plane and in a direction other than the plunger bar E, and being connectible by rods and links to the switch points. Lever F is provided with two heads, *e*, $e^1$ designed to occupy at predetermined positions of bars C, D recesses 11, 12, and 13, 14, formed in opposite sides of the long slots 15, 16, in bars C, D; and at other predetermined positions similar recesses $11^1$, $12^1$, and $13^1$, $14^1$, in the opposite sides of the said slots. The said construction deals with a slotted bar or bars embracing lever F, but the recesses may be formed in the outside edge or edges of said bar or bars.

In the latter case only one head *e* or $e^1$ of lever F would engage a recess in one bar, or coacting recesses in two or more bars. Obviously projections may be employed instead of recesses. Obviously lever F could be made with only one head *e* or $e^1$, the recesses in slots 15 and 16 being arranged to co-act therewith.

The bar C overlies bar D, both being movable independently, and both being provided with bolts *c*, $c^1$ the latter for connecting the said bars to the switch points through intermediate bars or links as is well understood.

Free to oscillate on (or integral with) shaft 5 is an oscillating base plate 23 fitted with an insulated contact carrier plate 24 carrying electrical contacts or segments *f*, $f^1$, *g*, $g^1$, and *h*, $h^1$ the whole forming a circuit controller or commutator; the contacts being disposed to contact with resilient or spring fingers, *i*, *j*, *k*, *l*, *m*, *n*, *o*, and *p*, mounted on blocks 34, $34^1$ secured to the base 21 by screws as shown, and with terminals *q*, *r*, *s*, *t*, *u*, *v*, *w*, and *x*, connected with a source of electrical energy by cables or wires led in through sockets or openings $24^1$.

Figure 7:
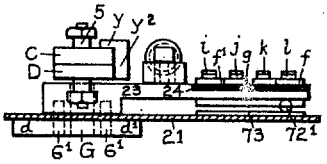

Instead of flat plates, as 23 and 24, we may employ curved plates, rotatable by any suitable intermediate operating mechanism. The oscillating plate 23 may be provided with balls 721 rolling on a path 73 (Figure 7). Beneath the contact fingers *i* to *p*, are keeper plates 72 which regulate the pressure of these fingers on contacts *f*, $f^1$, *g*, $g^1$ and *h*, $h^1$.

Figure 1:
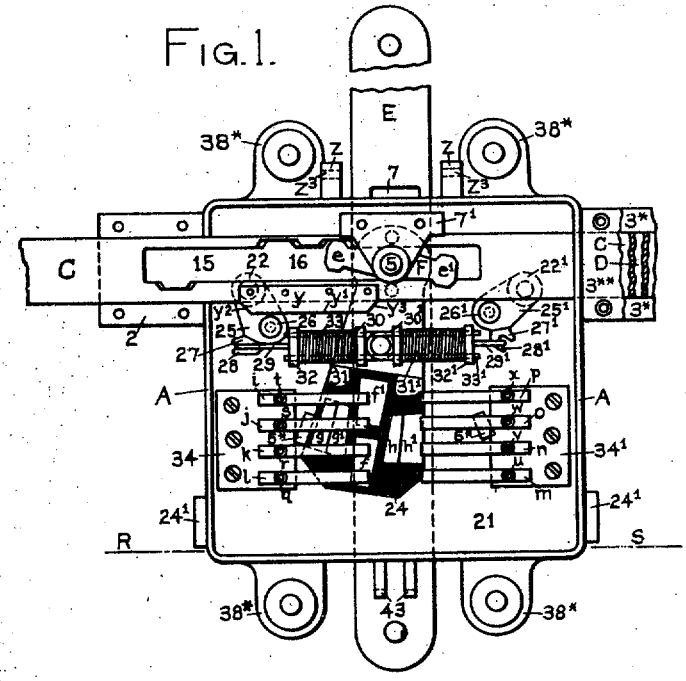
Figure 3:
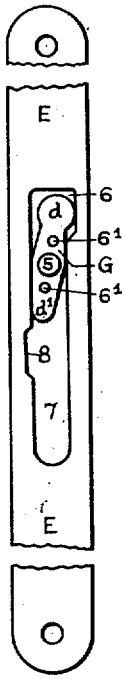
Figure 3 is a plan of the plunger bar, (or its extension) and pivoted lever.
Figure 2:
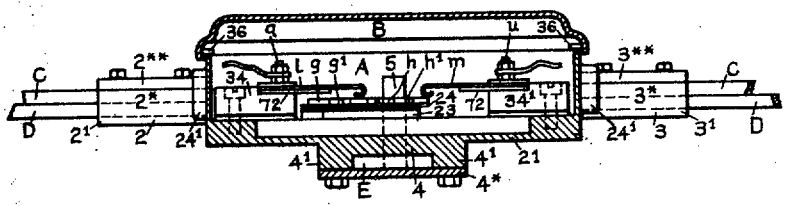
Figure 2 is an elevation on line R—S of Figure 1.
Figure 4:
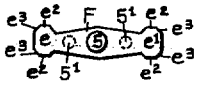
Figure 4 is a plan, and Figure 5 an elevation showing one of the levers used.
Figure 5:
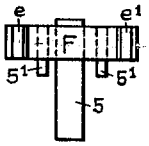

Lever F is connected to the plate 23 by dowels or screws $5^1$ (Figures 4 and 5) and the lever G to said base plate by dowels or screws $6^1$, these three parts constituting a structure oscillating positively as one solid unit, the oscillating being limited by stops 5*, 6* (Figure 1).

Lever G is located within slot 7 of plunger bar E, the head *d* entering recess 6 or recess 8 according to the position the bar occupies in the guide 4. As the head *d* of lever G enters say recess 6 the circuit controller or commutator moves into the left hand position as in Figure 1; when moved out of recess 6 by the operation of the plunger bar E, the head *d*,—entering that portion of the slot lying between the two recesses,—carries the commutator into (and holds it in) the central or neutral position as in Figure 6. Finally as it enters the recess 8, the commutator is moved into the right hand position, as will be well understood. The commutator is thus arranged to occupy predetermined positions controlling the flow, and the direction of flow of electric energy.

Figure 6:
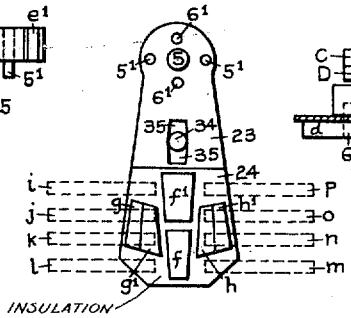
Figure 6 is a plan, and Figure 7 an elevation, showing the commutator, or circuit controller.

As the heads *e*, $e^1$ of lever F enters say recesses $11^1$, $12^1$, $13^1$, $14^1$ the circuit controller or commutator occupies the left hand position as in Figure 1, when they are moved out of said recesses $11^1$, $12^1$, $13^1$, $14^1$ by the operation of the bars C, D the lever F occupies that position in which its longitudinal axis lies parallel with the longitudinal axes of bars C, D and carries the commutator into (and holds it in) the central or neutral position as in Figure 6.

Finally when the movement of bars C, D is completed the heads $e$, $e^1$ enter the recesses 11, 12, 13, 14 the commutator is moved over into the right hand position, as will be well understood.

One or more such slotted bars may be employed as desired or according to the number of switch points our apparatus is desired to operate with or detect.

The base 21 of casing A carries two vertical studs 22, $22^1$. Free to oscillate on stud 22 is a lever or crank 25 which carries a roller 26 mounted on a pillar arranged to engage with the face $y^1$ of a striker $y$ carried by and secured to bar C (only one striker is required and may be secured to any of the bars as desired but not attached to more than one bar)—the angles $y^2$, $y^3$ being cut away to permit of easy contact of striker $y$ with the roller 26 and $26^1$. This lever or crank also carries a standard 27 having a forked head 28 to receive the looped end of a wire 29 connected to a flanged coil spring holder 30, within which one end of a coil spring 31 is seated, the other end of the coil spring being seated in a similar holder 32 held by a wire 33 looped over a pillar 34 on the oscillating base plate 23, (Figures 1 and 6).

Similarly a lever or crank, spring and attachment, are provided on the other side of the oscillating base plate 23, the similar parts being numbered $22^1$ and consecutively from $25^1$ to $33^1$. The function of these springs is to impel the circuit controller to assume either of two extreme positions.

Seats 35 (Figure 6) are provided on which the loops of the wire embracing pillar 34 rest. One or other of these coil springs acts to pull over the oscillating base plate 23 with its contacts $f$ to $h^1$, into either its extreme right or extreme left position according as the mechanisms are operated.

In Figure 1 it will be seen that the left hand lever 25 occupies a position unlike that of the right hand lever $25^1$; the difference also applies to the rollers 26 and $26^1$. This is owing to the movements of the bars C and D to the left carrying the bevel surface $y^2$ into contact with the roller 26, forcing the lever or crank 25 to pivot about the stud 22, and compressing the spring 31 which is held thus by the surface $y^1$ of the plate $y$ until through the continued forward movement of bars C and D the recesses $11^1$, $12^1$ and $13^1$, $14^1$, occupy a position to admit of the heads $e$, $e^1$ engaging with the same; and recess 6 of slot 7 in bar E also occupies a position to admit of the head $d$ of lever G engaging with the same, when the spring 31 will impel the controller to its extreme left position—as in Figure 1.

When the bars C and D are moved in an opposite direction, and roller 26 is released from surfaces $y^1$ $y^2$, these parts 25, 26, 27, 28 assume the position corresponding to that which parts $25^1$, $26^1$, $27^1$, $28^1$ are shown as occupying in Figure 1. If the movement of bars C and D be continued the surface $y^3$ will contact with roller $26^1$, and with the same results in respect to spring $31^1$, and the circuit controller will be impelled to the extreme right hand position, provided all bars C, D, E, are in their proper positions.

If any bar C, D, or E fail to complete its travel so as to occupy the position described the controller will be held in a central or neutral position against the pressure of spring 31 or $31^1$.

To secure cover B to case A hinge lugs Z, Z having holes $z^3$, $z^3$ are provided to receive pins projecting from lugs on the cover. On the opposite side of lid B are bolt lugs 37 between which is pivoted an L shaped link 38 in which is a hole 39 for the hasp of a padlock. Pivotally attached to link 38 is an L shaped lever 40 having a lip or lips 41 on its short arm and a slot 42 through which the short arm of link 38 protrudes leaving hole 39 clear to receive the padlock hasp. The latch lugs 43 on case A have a depending lip or claw 49 with which the projection or projections 41 engage as in Figure 13, when lever 40 is in the position shown.

For the purpose of describing the operation of our invention we assume the parts in Figure 1 occupy their normal position when the head $d$ of lever G occupies the recess 6 of slot 7 of plunger bar E; and the heads $e$, $e^1$ of lever F respectively occupy the recesses $14^1$, $11^1$ in bar C and $13^1$, $12^1$ in bar D, and the contact plate 24 occupying the position in Figure 1 over against stop $5^x$. Conversely the parts occupy their reverse positions when the head $d$ of lever G occupies recess 8 of slot 7 of plunger bar E, and the heads $e$, $e^1$ of lever F respectively occupy the recesses 12, 13 in bar C, and 11, 14 in bar D, and the contact plate 24 occupies a position to the right over against stop 6.

The recesses $14^1$, $11^1$, in bar C—and $13^1$, $12^1$, in bar D—register with heads $e$, $e^1$ of lever F, and recess 6 in bar E registers with head $d$ of lever G when the switch points are, say, normal; and the recesses 12, 13, in bar C—and 11, 14 in bar D—register with heads $e$, $e^1$ of lever F and recess 8 in bar E registers with head $d$ of lever G, when the switch points are, say reversed.

The said recesses may be so disposed and made of such length as to act upon the lever F and G so that when either or all of the bars C, D and E are moved from either their normal or reverse positions by any predetermined amount of the said arms, together with the contact plate 24, will be positively forced towards the central position against the pressure of the springs 31 or $31^1$.

The recesses above referred to may be formed of any desired length so that any predetermined movements of bar E, bar C, or bar D will force the contact plate 24 to the central position thereby making or breaking circuits, as may be arranged according to the disposition of contact springs as *i*, *k*, *l*, *l*, *m*, *n*, *o*, and *p* in relation to the contacts segments as *f*, *f*, *g*, *g*, *h*, $h^1$, as may be mounted upon the contact plate 24.

An incorrect movement of the plunger bar E or the switch points acting through the bar C, D, will always positively move the oscillating base plate 23 (with contact plate 24) towards its central position; and thus we obtain the required detection of the condition of a pair of points and its lock.

When the plunger bar E pushes against the head *d* of lever G it forces it out of recess 6 or8 against the pressure of spring 31 or $31^1$; the lever G rides hard on the edges of slot 7 until the spring pressure is released, by movement of bars C, D, connected to the switch points.

The foregoing description refers to a detector as applied to a single pair of switch points and as would be constructed for left hand location.

Figure 15 shows an application of our invention to compound switch points or double slip switches. Two each of bars as C and D with recesses as shown are used, but with the difference that one end of each of the two bars C which lie between the two bars D, is curved, for instance as shown in Figure 15. Striker *y* is attached as before to one bar only, preferably the uppermost and the lever F must be deep enough to engage all the said bars. The curved ends of bars C allow upper and lower pivot bolts 66 one in each bar to be clear of pivot bolts 67 on bars D.

To the bars C are pivoted by bolts 66 two bars or rods 50, 53. Rod 50 is pivoted to the top bar C, and rod 53 is pivoted to the bottom bar C. Rod 50 is pivotally connected to an extension piece 52 attached to switch point 51, which closes on to a rail 70. Rod 53 is pivoted to an extension piece 54 attached to switch point 55 which closes on rail 71.

Pivoted to the bars D by bolts 67, are two bars or rods 65 and 66. Rod 65 is pivoted to the top bar D and rod 66 is pivoted to the bottom bar D. Rod 65 is pivotally connected to the extension piece 59 attached to switch point 61 which closes on to the rail $70^a$. Rod 66 is pivotally connected to an extension piece 64 attached to switch point 67 which closes on to the rail $71^a$.

The extension 52 carries a bracket or lug 56, pivotally connected to which is a bar 57 pivotally connected to a bracket or lug 58, carried by an extension piece 59 attached to switch point 61, which closes on to a rail $70^a$, thus linking together the switch points 51 and 61, and compelling both to move in unison.

The extension 54 carries a bracket or lug 60, pivotally connected to which is a bar 62 pivotally connected to a bracket or lug 63 carried by the extension piece 64 attached to the switch point 67 which closes on to the rail $71^a$, thus linking the two switch points 55 and 67 together and compelling both to move in unison. Bars 57 and 62 are linked up to any suitable locking mechanism (not illustrated) operated by plunger rod E, an extension of which passes through the detector box and contains slot 7.

The motion of the switch points will simultaneously operate the bars C and D and the parts in the case A, including the oscillating base plate 23 with electrical contact springs carried thereby, thus revealing the positions of the said points whether normal, reverse, or intermediate (that is any position in which the switch points are not "home" and the roads properly and securely "made").

Figure 16 illustrates an application of our invention in which two complete detector boxes J and K are connected in two separate sets of switch points operated by a common lever in the signal box, but in detector box K the segments *a* and $h^1$ shown in the box J are omitted.

It will be understood that the parts diagrammatized in Figure 16 are linked up as usual to the parts with which they work and with semaphores or other signalling means.

The class of energy may be either alternating or direct current, and of whatever voltage is desired.

H is a polarized or three position relay having terminals 44, 45; terminal 44 is connected by wire $W^5$ to the contact spring *n* of detector box K, and terminal 45 through wire $W^6$ to spring *o* of same detector. The spring *n* of box K is also connected through wire $W^{12}$ to *j*; *o* to *k* of box K through wire $W^{11}$; *p* of K to *o* of box *j* by wire $W^3$, and *m* of box K to *n* of box J by wire $W^4$; *l* of box K to *k* of Box J by wire $W^2$, *i* of box K to *j* of box J by wire $W^1$, *p* of box J to *i* of box J by Wire $W^{10}$, and *m* of box J to *l* of box J by wire $W^9$.

Spring *l* of box J is also connected by wire $W^8$ to one terminal N (say negative) of a source of electrical energy; and *i* of box J by wire $W^7$ to the other terminal P (say positive) of the said source of energy.

The contact carrier of box J is provided with contacts, *f*, $f^1$; *g*, $g^1$; *h*, $h^1$ and the contact plate carrier of box K with contacts *f*, $f^1$, $g^1$, and *h*.

When the switch points are in say, the normal position as illustrated the connections will be as follows:—

Positive energy will flow from terminal P over wire $W^7$ to spring *i* of box J through contact segment $f^1$ to *j* of box J; thence through wire $W^1$ to *i* of box K, through segment $f^1$ to $j$ of box K, and thence over wire $W^{12}$ and wire $W^5$ to 44 of relay H, through a coil or winding 46 to 45 of relay H, over wire $W^6$ and wire $W^{11}$ to $k$ of box K, through segment $f$ to $l$ of box K, thence over wire $W^2$ to $k$ of box J through segment $f$ to spring $l$ of box J thence over wire $W^8$ to terminal N. Wires $W^3$ and $W^4$ connected to $o$ and $n$ of box J are short circuited through segment $h^1$. The flow of current through relay H causes the latter to operate so as to close a set of electrical contacts corresponding to the assumed normal position of the rail points.

When the switch points are in the reverse position to the above the connections will be as follows:—

Positive energy will flow from terminal P over wire $W^7$ and $W^{10}$ to contact $p$ of box J, thence through segment $f^1$ to $o$ of box J, over wire $W^3$ to $p$ of box K, through segment $f^1$ to $o$ of box K, thence over wire $W^6$ to terminal 45 of relay H, through a coil or winding 46 of relay H to 44, thence over wire $W^5$ to $n$ of box K, through segment $f$ to $m$ of box K, via wire $W^4$ to $n$ of box J, through segment $f$ to $m$ of box J, thence over wire $W^9$ and wire $W^8$ to terminal N.

Wires $W^1$ and $W^2$ connected to $j$ and $k$ of box J are short circuited through segment $g$ of box J.

The flow of current through relay H causes the latter to operate so as to close a set of electrical contacts corresponding to the assumed reverse position of the switch points.

It will be seen that when the parts were in normal position the current flowed through the coil 46 of relay H in the direction from 44 to 45, and that in the reverse position the current flowed through the coil 46 from 45 to 44.

Signals governing train movements over switch points to which box J and box K are attached may have their electrical control circuits taken through either normal or reverse contacts in relay H as may be required, thus detecting that said points are in their proper position for the desired train movement.

If any condition such as previously outlined causes the base plate 23 of box K with its contact plate 24 to occupy a central position all energy will be disconnected from contacts $n$, $o$ of box K and $k$, $j$ of box K; and further, wires $W^5$ and $W^6$ will be short circuited between $n$ and $o$ through segment $h$ of box K, and between $j$ and $k$ of box K through segment $g^1$ of K, thus leaving the coil or winding 46 of relay H disconnected from energy as well as being short circuited.

Assuming another condition in which box K is normal and box J occupies the central position:—In this position all energy is disconnected from contacts $k$ and $j$ of box J, and wires $W^1$ and $W^2$ are short circuited between $j$ and $k$ and through segment $g^1$ of box J, thus again leaving the coil 46 of relay H disconnected from energy and short circuited.

Assuming another condition in which box K is reversed and box J occupies the central position:—Then all energy is disconnected from the contacts $n$ and $o$ of box $J$, and wires $W^3$ and $W^4$ are short circuited between $o$ and $n$ through segment $h$ of box J, thus again leaving the coil 46 of relay H disconnected from energy and short circuited.

Assuming another condition in which box K is normal; and box J is reversed:—Then all energy is disconnected from contacts $j$ and $k$ of box J, and wires $W^1$ and $W^2$ are short circuited between $j$ and $k$ through segment $g$ of box J, thus again leaving the coil 46 disconnected from energy and short circuited.

Assuming another condition in which box K is reversed and box J normal:—Then all energy is disconnected from contacts $n$ and $o$ of box J, and wires $W^3$ and $W^4$ are short circuited between $o$ and $n$ through segment $h^1$ of box J, thus again leaving the coil 46 of relay H disconnected from energy and short circuited.

In the foregoing we have described and illustrated mechanism or mechanisms to give effect to our invention, but we do not limit ourselves to parts as shown in the drawings but may adopt modifications without departing from our invention.

What we claim as new and desire Letters Patent for is:—

1. Detector apparatus for switch points including intersecting bars, levers to co-act with the bars, and a controller to be moved or oscillated near the point of intersection of the bars, as and for the purposes set forth.

2. A detector apparatus for switch points including bars movable with the switch points, levers connecting with the bars, and a controller movable about the point of intersection of the bars, substantially as described.

3. Detector apparatus for switch points including bars, levers moved by said bars, and a controller moved by said levers about the point of intersection of the bars, substantially as described.

4. Detector apparatus for switch points including intersecting bars having slots therein and recesses in the slots, levers occupying the slots in said bars and having heads to engage in said recesses, and a controller connected to said levers, substantially as described.

5. Detector apparatus for switch points including intersecting bars having slots therein and recesses in the slots, levers occupying the slots in said bars and having heads to engage in said recesses, and a controller movable about the point of intersection of the bars and connected to said levers, substantially as described.

6. In a detector apparatus for switch points and their locking mechanism, the combination of movable bars connected to said switch points and to the locking mechanism, said bars having slots therein and recesses in the slots, levers in the slots having heads engageable in the recesses, and a controller rigidly connected to said levers and rocking with the levers when said bars are moved, substantially as described.

7. In a detector apparatus for switch points and their locking mechanism, the combination of bars movable with the switch points and having slots therein and recesses in the slots, a plunger bar movable with the locking mechanism and having a slot therein and recesses in the slot, a controller, and a pair of levers rigidly connected to said controller, one of said levers being fitted in the slots in said first mentioned bars, the other lever being arranged in the slot in said plunger bar, said levers having heads engageable in the recesses in said bars, the levers being rocked by the movement of said bars, substantially as described.

8. A point detector for railway switches comprising, a contact carrying member movable from a central position to either of two extreme circuit controlling positions, insulated contact springs cooperating with the contacts carried by said member to govern circuits in each of the positions of said member, resilient means for moving said carrier to its extreme positions, a plurality of independently movable bars separately connected to the switch points and each having recesses spaced longitudinally thereon, and means connected to said carrier and provided with projections cooperating with said recesses for permitting movement of the carrier to an extreme position when all of the bars are in a corresponding extreme position and for positively forcing the carrier to its central position upon displacement of any one of the bars from its extreme positions.

9. A point detector for railway switches comprising, an oscillatable contact carrier shiftable from a central position to either of two extreme circuit controlling positions, said carrier having projections on opposite sides of its axis of oscillation, spring means for moving said carrier to its extreme positions, and a plurality of independently movable bars separately connected to the switch points, each of said bars having spaced recesses adapted to receive the oppositely disposed projections on the carrier and thereby permit the carrier to be oscillated by the spring means to one extreme position when all of the bars are in a corresponding extreme position, said recesses and projections also cooperating to positively force the carrier to its central position when any one of the bars is displaced from an extreme position.

10. In a detector apparatus for switch points and their locking mechanism, a plurality of independently movable bars arranged side by side and separately connected to the switch points, a locking plunger disposed at an angle to said bars, a contact carrier mounted for oscillation near the point of intersection of the bars and locking plunger, spring means for moving said carrier from a central position to its extreme positions, means on each of said bars and on the carrier collectively cooperating to permit the carrier to assume an extreme position when all of the bars are in a corresponding extreme position, said means acting to positively force the carrier to its central position when any one of said bars is displaced from its extreme positions, and means actuated by the locking plunger for positively forcing the carrier to its central position independently of said bars when the plunger is shifted to its unlocked position.

GEORGE H. WION.
ALFRED E. HUDD.